United States Patent [19]

Monti et al.

[11] Patent Number: 4,596,492
[45] Date of Patent: Jun. 24, 1986

[54] PROCESS FOR BRINGING ASHORE THE ENDS OF UNDERWATER CABLES AT ARRIVAL LANDING POINTS

[75] Inventors: Giuseppe Monti, Monza; Gianmario Lanfranconi, Trezzo D'Adda, both of Italy

[73] Assignee: Societa' Cavi Pirelli, S.p.A., Milan, Italy

[21] Appl. No.: 600,360

[22] Filed: Apr. 13, 1984

[30] Foreign Application Priority Data

Apr. 13, 1983 [IT] Italy ................................ 20572 A/83

[51] Int. Cl.[4] ................................................ F16L 1/04
[52] U.S. Cl. .................................... 405/171; 405/154; 405/156; 254/134.3 R; 254/134.3 SC
[58] Field of Search ............... 254/134.3 R, 134.3 SC; 405/158, 166, 170, 171

[56] References Cited

U.S. PATENT DOCUMENTS

| | | | |
|---|---|---|---|
| 3,473,340 | 10/1969 | Ferrentino | 405/166 |
| 3,656,309 | 4/1972 | Bultema | 405/171 |
| 3,727,417 | 4/1973 | Shaw | 405/171 |

*Primary Examiner*—Frederick R. Schmidt
*Assistant Examiner*—Judy J. Hartman
*Attorney, Agent, or Firm*—Brooks Haidt Haffner & Delahunty

[57] ABSTRACT

In laying an electric cable underwater, the finishing end of the cable is brought ashore by laying the cable end portion (from the cable laying ship) along a course parallel to the shore and as close to the shore as the ship can reach, then pulling the cable end to shore using a rope, pulling the cable end along the shore to the intended landing point, and then pulling the cable end in-land along the intended laying line until the whole cable is positioned along this line. Buoyancy devices are attached at intervals to the cable end portion for the duration of the landing process, to facilitate the sliding movement of the cable over the bottom.

9 Claims, 4 Drawing Figures

PROCESS FOR BRINGING ASHORE THE ENDS OF UNDERWATER CABLES AT ARRIVAL LANDING POINTS

The present invention relates to a process for bringing ashore the ends of underwater or submarine electric cables at arrival landing points.

In order to lay an underwater or submarine electric cable, firstly a line is determined along which the cable is to be laid. Subsequently a ship, containing in its hold the whole cable to be laid (comprising a single length wound in a coil), moves along a course which follows closely the predetermined laying line and the cable is paid out from the ship gradually and laid on the bottom of the course of water. Difficulties are met in near the shores, namely at the so-called "landing points". Of the two landing points of a cable, respectively the start landing point and the arrival landing point, the difficulties and risks are encountered especially at the latter. In fact for landing the cable end at the start landing point it is sufficient to keep the stationary ship at a predetermined point on the laying line: then the cable end is connected to a drawing line or rope leading from the coast and the cable end is drawn ashore care being taken to avoid the cable being bent at any stage, for example under the action of wind, waves or currents, to less than a minimum bending radius. However the same procedure cannot be followed at the arrival landing point: the cable end which is to be brought ashore is covered by the remaining length of cable which is coiled in the hold of the ship.

The length of cable end remaining in the ship's hold, and to be brought ashore at the arrival landing point depends on the sounding depth along the shore where the landing is to be effected, and therefore upon how close to the shore the ship can reach. The cable laying ship is a merchant ship of large size and tonnage and therefore of deep draught. Consequently the ship is obliged to stop at a considerable distance from the shore for safety. Generally, the ship requires a sounding depth of around 20 meters and in the case of sandy shores, this depth of water is available only at a very long distance (sometimes several kilometers) from the shore. In such cases the length of cable to be brought ashore is very long, especailly as the cable will be required to extend for some distance along a predetermined path on the land itself.

For bringing ashore a cable at an arrival landing point, it is known to use auxiliary vessels of shallow draught, for instance catamarans, in order to draw the cable as near as possible to the shore. A bight is formed in the cable from the ship, which contains in its hold the remaining portion of cable to be laid: this bight is run over a pulley provided on the auxiliary vessel and the cable is paid out from the ship's hold (under appropriate tension) while the auxiliary vessel moves toward the shore. Particular care must be taken to maintain under tension the length of cable between the auxiliary vessel and the bottom of the sea (over which length the cable takes the form of a catenary) in order to avoid harmful stresses on the cable, at the foot of the catenary, arising through movements of the auxiliary vessel under the action of waves. During the later stages, the end portion of the cable is made to float by applying appropriate means to it. Finally, the end of the cable is drawn ashore whilst maintaining it under tension, and duly positioned along its intended line or path, and the means used for floating the cable are removed.

In the above process for bringing ashore the end of the cable at the arrival landing point, the end portion of the cable is subjected to the actions of waves, wind and water currents existing near the shore, even if it is maintained under tension. Wave action subjects the cable to fatigue stresses, particularly at the foot of the catenary portion of cable disposed between the auxiliary vessel and the sea bottom. These fatigue stresses are greater the higher the waves occuring during the landing operation, thus increasing the risk of shortening the useful lifetime of the cable in service. The action of wind and currents, besides subjecting the cable to fatigue stresses, can cause the cable to be bent to a radius less than the minimum permitted, with the result of irreparable damage to the cable itself.

We have now devised a process for bringing ashore the end of an underwater cable at an arrival landing point, which process eliminates or reduces the risks to the cable which derive from the action of waves, wind and currents, at the landing point, and which enables the cable to be brought ashore without needing auxiliary vessels and without the cable laying ship being obliged to remain near the shore for a substantial proportion of the time required for the landing operation.

In accordance with the present invention, there is provided a process for bringing ashore the end of an underwater cable at its arrival landing point, which cable has been laid from a cable laying ship as the ship moves along a course following a predetermined laying line until the ship nears a boundary where the depth of water becomes insufficient for the ship, said process comprising the steps of steering the ship along a course deviating from the predetermined laying line and generally parallel to the shore along or adjacent said boundary, laying the end portion of cable along this course, applying buoyancy devices to said end portion of the cable, moving the submerged end portion of the cable over the bottom of the stretch of water until it is positioned along the predetermined laying line and runs ashore at the arrival landing point, and removing said buoyancy devices from the cable.

In a preferred embodiment, for moving the end portion of cable over the bottom of the stretch of water until it is positioned along the predetermined laying line, firstly the cable end is pulled ashore by a drawing line and then pulled along the shore to the predetermined landing point, then the cable end is pulled in-land along the predetermined laying line.

Preferably the buoyancy devices are applied to the cable end portion as it is laid from the ship.

An embodiment of the present invention will now be described, by way of example only, with reference to the accompanying drawings, in which.

Before bringing ashore the end of an underwater or submarine electric cable at the arrival landing point, a cable laying ship has been used to lay the cable along the predetermined laying line, except for the last portion i.e. near the arrival landing point. The cable comprises a single length contained in the ship's hold as a coil and is paid-out from this.

Figure 1:
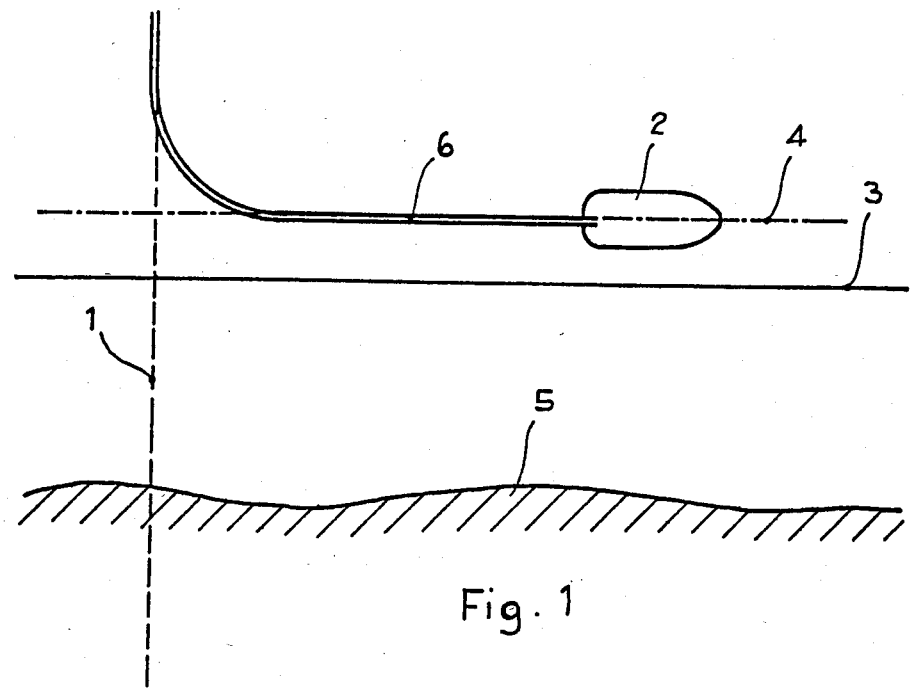
FIG. 1 is a plan-view diagram to illustrate an initial step in a process in accordance with the present invention for bringing the end of a cable ashore at the arrival landing point.

In FIG. 1, dashed line 1 designates the laying line which has been planned for cable, extending across the sea or water course and onto and across a tract of land at the arrival landing point. The ship 2 has followed a course corresponding closely with the laying line 1, until it arrives near a boundary 3 which cannot be crossed safely by the ship 2, because of the limited depth of water existing between that boundary and the shore line 5. Then, the ship leaves the predetermined laying line and moves, as shown in FIG. 1, along a path 4 parallel to the shore line 5, laying the cable end portion 6 along this path: the cable end portion has a predetermined length appropriate to reach the required termination point on land, when this cable end portion is placed into position on the predetermined laying line 1.

While the ship moves along the course 4 parallel to the shore, the cable end portion 6 is maintained under tension to prevent it adopting a catenary form of inadmissible-small bending radius in the portion between the ship and the sea bottom. Whilst the cable end portion is being laid, buoyancy devices are applied to the cable in a releasable manner to reduce its weight in water.

When the end portion 6 of the cable has been laid along the course 4 parallel to the shore 5, then before the end of the cable is paid out from the ship 2, one end of a flexible drawing line or rope 8 is attached to the end of the cable, the drawing rope 8 being long enough for its other end 9 to be brought onto the shore 5 for carrying out the subsequent steps of the process.

When the end portion 6 of the cable has been laid along the course 4 parallel to the shore and the rope 8 attached to the cable, the ship 2 can freely move away and the end 9 of the drawing rope 8 is brought ashore. The configuration of the cable and drawing rope 8 is shown in full lines in FIG. 2. The whole cable now lies on the bottom of the stretch of water, and the length of cable laid parallel to the shore is provided with the buoyancy devices to reduce its weight underwater. These buoyancy devices may be applied after the cable has been laid along the course 6, for example, by frogmen, instead of being applied whilst the cable is being so laid.

Figure 2:
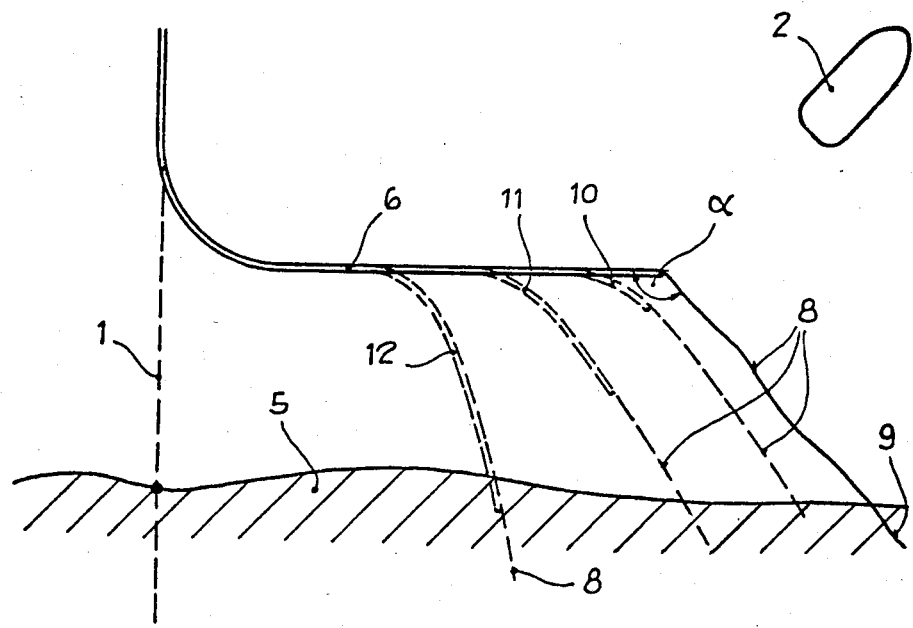
FIG. 2 is a similar view of the end portion of a cable after it has been paid-off from the cable laying ship and attached to a drawing line or rope for pulling the cable end ashore, the configuration of the cable end portion being shown at successive stages.

Next tension is applied to the drawing rope 8 to pull the end of the cable ashore. During this step, in order to avoid the end portion 6 being bent to an inadmissibly small radius, the movement of the cable underwater is supervised by frogmen. The rope 8 must be pulled in such a way, as shown in FIG. 2, that it forms with the cable an angle α which is greater than a right angle. FIG. 2 shows in dashed lines successive configurations 10, 11 and 12 of the cable and rope 8 as the cable end is brought closer to shore (and eventually onto land) and at the same time closer towards the laying line 1.

After having reached the shore, the cable end is slid along the shore and preferably along the water edge on chutes provided with rollers (not shown), to bring the cable end to the position 13 (FIG. 3) at which the laying line 1 comes ashore: at this position will be provided an appropriately curved chute provided with rollers (not shown). When drawing the cable end along the shore, a certain length of the cable will also slide along the shore and to facilitate this, the buoyancy devices are removed from the cable as successive lengths of cable are drawn out of the water.

Figure 3:
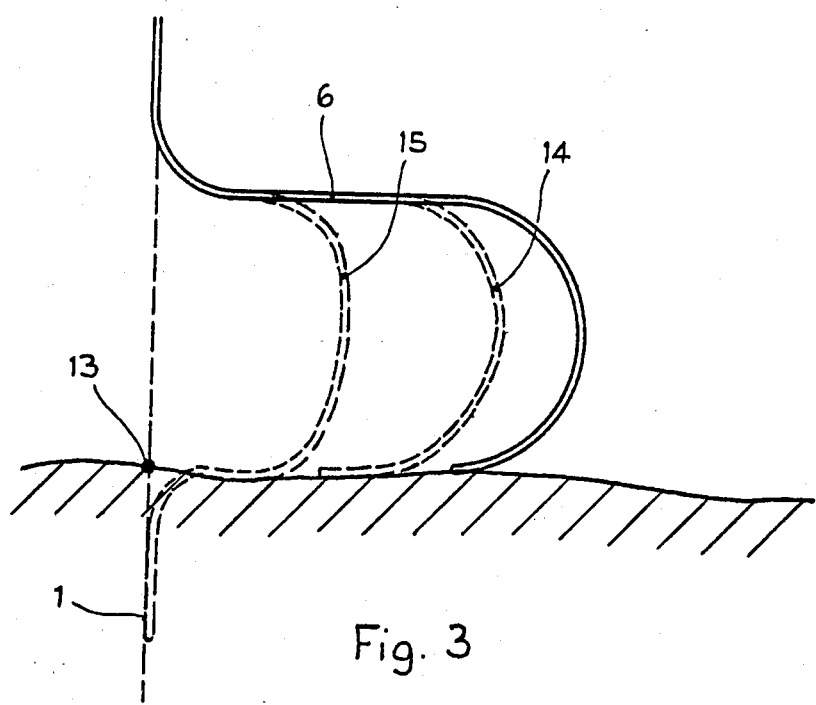
FIG. 3 is a similar view showing the cable at successive subsequent stages wherein the end portion of the cable is moved under water to a position along the predetermined laying line.

Referring to FIG. 3, at the same time as a certain length of the cable slides along the shore, there is a submerged length of cable which slides on the bottom of the sea, the configuration of the cable at successive stages being shown by dashed lines 14 and 15. This sliding of the cable on the bottom of the sea is supervised by frogmen, who can help manually the sliding movement of the cable to ensure that it overcomes any unevennesses of the bottom, the buoyancy devices rendering this manual movement of the cable possible.

Figure 4:
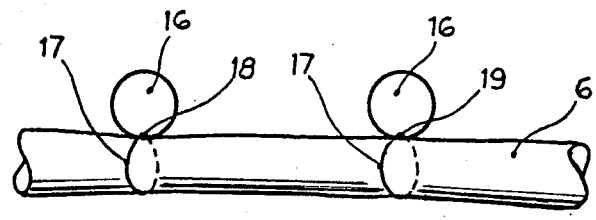
FIG. 4 is a side view of a length of the cable showing buoyancy devices attached to it.

Once the cable end has reached the landing position 13, it is moved in-land along the laying line 1 until the whole end portion 6 of the cable is disposed along this laying line. The remaining buoyancy devices are removed from the submerged length of cable. The buoyancy devices used should serve to reduce the weight of the cable under water to a few kg per meter of cable so as to allow manual movement by the frogmen without fatigue. The devices preferably give a buoyancy effect which is independent of the depth to which they are submerged. FIG. 4 shows diagrammatically a length of the cable portion 6 provided with a preferred example of buoyancy devices. These comprise hollow rigid spheres 16, for instance of plastics material, fastened by ropes 17 or the like to the cable at points 18 and 19 spaced along its length.

Instead of using hollow rigid spheres, small inflatable spheres can be used and these are particularly appropriate when it is desired to attach the buoyancy devices to the cable 4 after the cable end portion has been laid along the course parallel to the shore.

The spacing chosen between the points of application 18 and 19 of two adjacent buoyancy devices is important and depends on the stiffness of the cable. Generally, this spacing should be such that the intervening length of cable would exhibit substantially no bending deformation due to its own weight if it were suspended at one point (18 or 19). By way of example, for a cable having an outer diameter of 100 mm, the spacing between two adjacent buoyancy devices might be approximately 3 meters. Accordingly, whilst the cable slides along the bottom with manual assistance from the frogmen, it is not subjected to stresses bending it to a curvature of less than the minimum permissible radius, and irreparable damage to the cable is thus avoided.

It will be appreciated that in the above-described process in accordance with the present invention, the cable end portion is protected from any action due to waves, wind and possible currents occuring near the shore. In fact the cable end portion, after having been laid from the ship in its course 4 parallel to the shore, it is moved into its position along the laying line 1 whilst being maintained underwater and in contact with the bottom, where any currents are minimal compared to the currents possibly occuring on the surface. Thus fatigue stresses in the cable are avoided, likewise risks of bending the cable to less than its permitted radius.

The embodiments of the invention in which an exclusive property or privilege is claimed are defined as follows:

1. In a process for laying a continuous underwater cable from a water-bourne ship, said cable being carried on said ship and having an end to be brought ashore and to a termination point on the shore, in which the cable is laid from said ship as the ship moves along a first course following a predetermined laying line until the ship reaches a boundary point where the water is shallow and which is at a distance from the shore line, at which boundary point an end portion of the cable sufficient in length to extend from said boundary point to said termination point and including said end thereof remains on said ship, the improvement in bringing said end ashore which comprises the steps of:

moving said ship from said boundary point along a second course extending at an angle to said predetermined laying line and generally parallel to said shore line while laying said end portion of the cable in the water along said second course until at least substantially all of said length of said end portion has been laid in the water along said second course;

applying buoyancy devices to said end portion of the cable;

while pulling said end of the cable toward the shore, moving the portion of the cable which is intermediate said end and said boundary point and which remains in the water through the water toward said predetermined laying line until said end is on the shore and said end portion is positioned along said predetermined laying line; and removing said buoyancy devices from said portion of said cable.

2. A process as set forth in claim 1 wherein said end of the cable is laid in the water and is pulled to the shore and then pulled along the shore to said predetermined laying line after which said end is pulled in-land along said predetermined laying line.

3. A process as set forth in claim 2 wherein as said end is pulled, the length of the cable being pulled ashore is bent with respect to said course and the angle of the bend is maintained greater than a right angle.

4. A process as set forth in claim 1 wherein said buoyancy devices are applied to said end portion of the cable in spaced relation, the spacing of said buoyancy devices being selected to prevent significant bending of the cable between said buoyancy devices when the cable is suspended underwater by one of said buoyancy devices.

5. A process as set forth in claims 1, 2, 3 or 4 wherein said buoyancy devices are applied to said end portion of the cable as it is layed from the ship.

6. A process as set forth in claims 1, 2, 3 or 4 wherein said buoyancy devices are applied to said end portion of the cable after it has been laid in the water.

7. A process as set forth in claims 1, 2, 3 or 4 wherein said buoyancy devices are selected to permit said end portion to lie under water.

8. A process as set forth in claims 1, 2, 3 or 4 wherein said buoyancy devices are hollow, rigid spheres releasably secured in spaced relation to said end portion of the cable.

9. A process as set forth in claims 1, 2, 3 or 4 wherein said buoyancy devices are inflatable spheres.

* * * * *